(No Model.)
C. H. COX.
PLATFORM GATE FOR CARS.
No. 508,815. Patented Nov. 14, 1893.
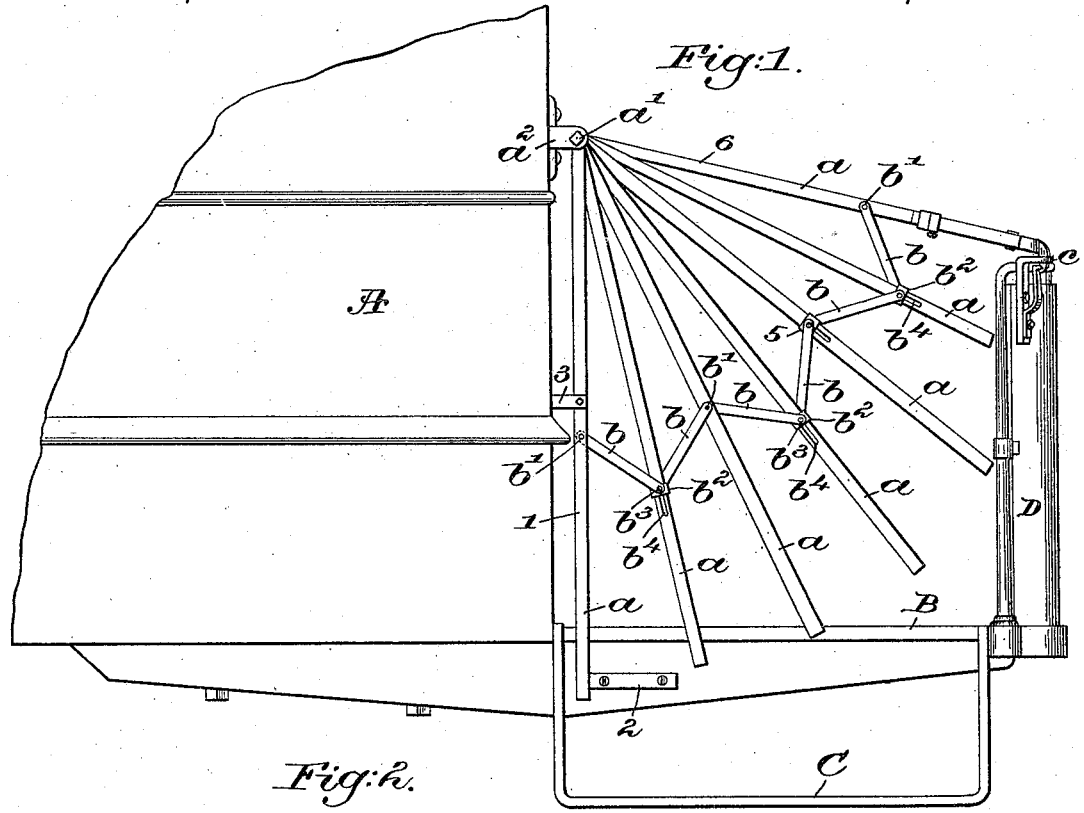
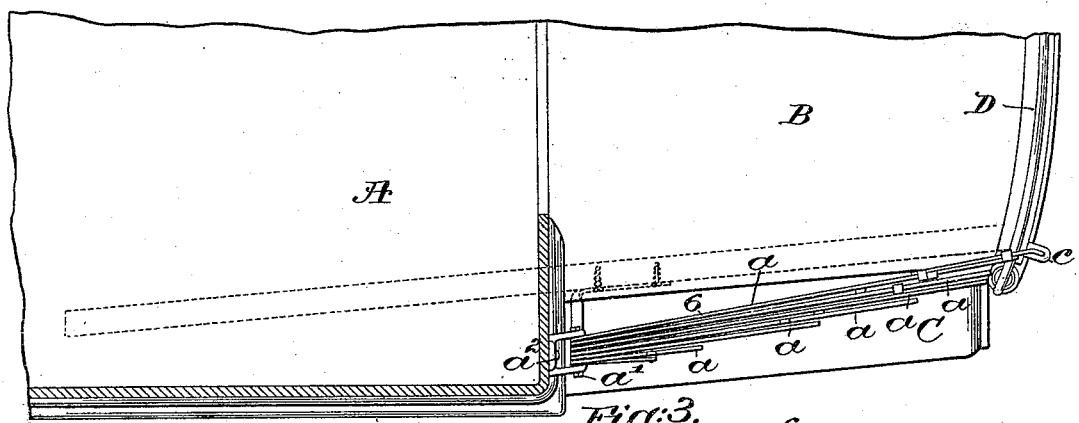
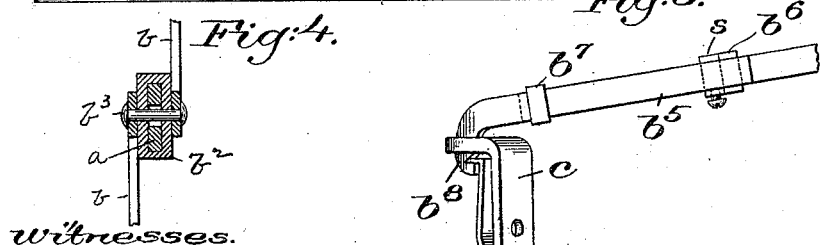
Witnesses.
Fred S. Greenleaf.
Louis W. Sowell.
Inventor:
Charles H. Cox.
By Crosby & Gregory
Attys
THE NATIONAL LITHOGRAPHING COMPANY.
WASHINGTON, D. C.

UNITED STATES PATENT OFFICE.

CHARLES H. COX, OF BROCKTON, ASSIGNOR OF ONE-HALF TO EDWARD H. HOYT, OF BRADFORD, MASSACHUSETTS.

PLATFORM-GATE FOR CARS.

SPECIFICATION forming part of Letters Patent No. 508,815, dated November 14, 1893.

Application filed March 2, 1893. Serial No. 464,308. (No model.)

*To all whom it may concern:*

Be it known that I, CHARLES H. COX, of Brockton, county of Plymouth, State of Massachusetts, have invented an Improvement in Platform-Gates for Railway-Cars, of which the following description, in connection with the accompanying drawings, is a specification, like letters and figures on the drawings representing like parts.

This invention relates to platform gates for railway cars, the object of the invention being to provide a simple, effective and durable gate, and one which may be closed into the smallest possible space when not in use.

My improved gate consists of a series of bars pivoted at one of their ends to a proper support, the opposite ends of the bars being free to be opened or spread out like a fan to close the entrance to the platform. The several bars forming the main part of the gate are preferably connected by suitable spacing or connection links which serve to stiffen the gate against lateral deflection when the gate is opened, yet which permit the gate to be closed or collapsed when not in use. A suitable fastening device is provided by which to fasten the gate when opened.

Figure 1 of the drawings represents in side elevation a sufficient portion of a car body and platform to enable my invention to be understood, said car body being fitted with one form of gate embodying this invention, the same being shown as opened to close the entrance to the platform; Fig. 2, a top or plan view of Fig. 1; Fig. 3, a rear side detail view on an enlarged scale showing one form of fastening device; and Fig. 4, a sectional detail to be described.

Referring to the drawings, A represents the end of a car body; B the platform; C the step, and D the dasher, all of which may be of usual or desired construction.

My improved gate consists of a series of bars or members, as $a$, jointed at one of their ends preferably to a common pivotal bolt $a'$ held by the arms of a V-shaped bracket $a^2$ bolted or otherwise secured to the car body, as shown. It is not essential, however, that the several bars $a$, be jointed to the same pivot bolt so long as their adjacent ends are pivoted adjacent to each other to permit their opposite free ends to open like a fan. One of the outside bars $a$, as for instance, the bar numbered 1, is rigidly secured at its bottom by a bracket 2 to the platform B, or to a support therefor, and at an intermediate point by a bracket 3.

The several gate bars are connected together by a series of spacing links or connections $b$, preferably pivoted, as shown, to alternate bars as at $b'$, while the opposite ends of the connections are pivoted to collars $b^2$ fitted to slide on the intermediate bars, the pivotal bolts $b^3$ being preferably extended through slots $b^4$ in the said intermediate bars, as shown. I may, however, if desired, pivot the connections to slide collars at both their ends, as shown at 5, though I prefer to pivot them to alternate bars only and have the intermediate alternate bars alone provided with the sliding collars. The normal position of the gate is closed or collapsed like a fan, said gate when in such condition lying close up against the car body and protruding only to the thickness of the first or rigid bar 1.

When it is desired to open the gate for the purpose of closing the entrance to the platform, the operator grasps the outside bar 6, and draws the same outwardly and upwardly into its position Fig. 1, the connections $b$ spreading the other bars or causing the same to be drawn or spread out like a fan, as shown, at regular distances from said outer bars to close the entrance to the platform. The upper bar 6, which is preferably made slightly heavier or stiffer than the others, is rested upon and secured in suitable manner to the dasher D, or any other suitable support which may be provided.

As one form of fastening device, I have shown the upper bar 6 as provided at its outer end with a sliding extension piece $b^5$, provided at one end with a collar $b^6$ which embraces the bar 6, said extension piece at its outer end sliding in a collar $b^7$ on the outer end of the bar 6. The outer end of the extension piece $b^5$ is downturned and hooked or notched, as at $b^8$, so that when the gate has been opened, this extension piece may be run out over the dasher and its hooked end dropped into an eye in a plate $c$ secured to the front of the dasher, a spring $c'$ springing into the notch $b^x$ in the hook to hold the gate in its position closing the platform entrance.

I have herein shown the bar 6 as provided with an adjustable stop collar $s$ to limit the outward sliding movement of the extension piece, and prevent bending of the upper bar 6 should a person lean heavily against it.

This invention is not limited to the particular construction or arrangement of parts herein shown, for the same may be varied without departing from the spirit and scope of this invention.

I prefer to employ spacing connections substantially as shown, but the invention is not limited thereto.

While I prefer to attach the bars to the car body, yet I desire it to be understood that the bars may, if necessary, be attached to the dasher and spread toward the car body and secured thereto.

I have herein illustrated my improved gate as applied to closed cars having end entrances only, the gate being attached either to the car body or the dasher, but I desire it to be understood that this invention may be equally well applied to the usual open summer cars which are provided with several entrances distributed along a side of the car, in which case the posts at each side constitute the supports, to one of which the gate is secured and to the other of which is applied the fastening device.

It is not deemed necessary to illustrate this invention in connection with the open car, as the construction is substantially the same.

I have herein described my invention in connection with one specific form of device, but

What I claim, and desire to secure by Letters Patent, is—

1. The herein described gate consisting of a series of bars, pivoted at one of their ends and having their opposite ends free to be spread like a fan, combined with two supports, to one of which the pivoted ends of said bars are attached, and to the other of which the movable end of said gate is secured when spread, substantially as described.

2. The combination with a car body, an entrance passage therefor, and two supports, one at each side of said entrance, of a gate consisting of a series of bars pivotally secured to one of said supports and adapted to open like a fan, spacing connections between said bars, and a fastening device on the other of said supports to which the upper bar of the gate may be secured when the gate is spread, substantially as described.

3. The herein described platform gate consisting of a series of bars pivoted at one of their ends and having their opposite ends free to be opened like a fan, sliding collars $b^2$ on said bars, and links connecting said collars, to operate, substantially as described.

4. A car body, a platform and dasher therefor, combined with a platform gate consisting of a series of bars pivoted at one of their ends and adapted to open like a fan, a sliding extension piece on the uppermost of said bars, and a co-operating fastening device therefor upon the dasher, substantially as and for the purpose specified.

5. A car body, a platform and dasher therefor, combined with a platform gate consisting of a series of bars pivoted at one of their ends and adapted to open like a fan, a sliding extension piece on the uppermost of said bars, a co-operating fastening device therefor upon the dasher, and an adjustable stop to limit the outward sliding movement of said extension piece, substantially as and for the purpose specified.

6. A car body, a platform and dasher therefor, combined with a platform gate consisting of a series of bars pivoted at one of their ends and adapted to open like a fan, a sliding extension piece having a notched hooked end carried by the uppermost of said bars, a plate secured to the dasher and having an eye, through which said hook may be inserted, and a spring to co-operate with said notch to lock the extension piece to said plate, substantially as described.

7. The combination with a car body, a platform and a dasher therefor, of a platform gate consisting of a series of bars pivotally attached to the car body, one of the outside bars being rigidly attached also to the car body, the other outside bar being adapted to be raised and secured to the dasher, and spacing connections whereby the intermediate bars are caused to be spread out like a fan between the two outside bars, substantially as described.

8. The combination with a car body, a platform and a dasher therefor, of a platform gate consisting of a series of bars pivotally attached to the car body at one of their ends, and links, as $b$, connecting said bars and having a sliding connection with some or all thereof whereby said bars though connected are made to open and close like a fan, substantially as described.

In testimony whereof I have signed my name to this specification in the presence of two subscribing witnesses.

CHARLES H. COX.

Witnesses:
HERBERT H. CHASE,
E. H. FLETCHER.